(No Model.)
T. McGOWAN.
STILL LINING.
No. 492,419. Patented Feb. 28, 1893.
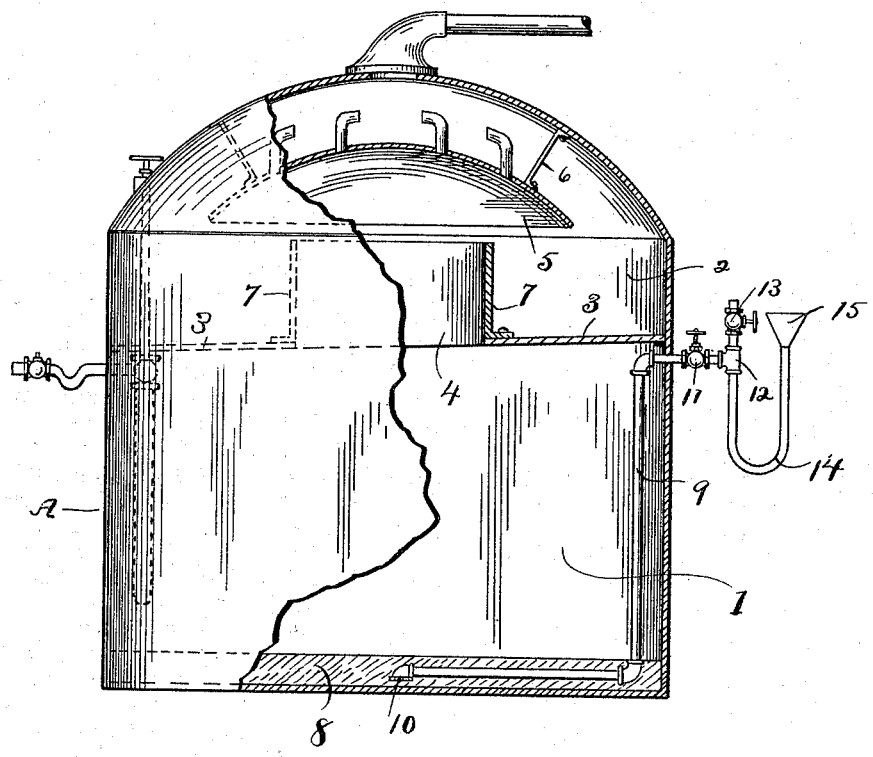
Witnesses.
E. Byron Gilchrist
Inventor.
Thomas McGowan

UNITED STATES PATENT OFFICE.

THOMSON McGOWAN, OF CLEVELAND, OHIO.

STILL-LINING.

SPECIFICATION forming part of Letters Patent No. 492,419, dated February 28, 1893.

Application filed July 8, 1891. Serial No. 398,845. (No model.)

*To all whom it may concern:*

Be it known that I, THOMSON MCGOWAN, of Cleveland, in the county of Cuyahoga and State of Ohio, have invented certain new and useful Improvements in Still-Linings; and I do hereby declare the following to be a full, clear, and exact description of the invention, such as will enable others skilled in the art to which it pertains to make and use the same.

My invention relates to an improved still lining adapted for use in the process of distilling and desulphurizing hydrocarbons, more especially crude petroleum.

The following facts are well established, viz.;—that crude petroleum contains more or less sulphur, and particularly is this true of the American oil;—that the presence of this element, (sulphur,) in the oil, is exceedingly objectionable for reasons well known, and that its removal is of great commercial value and importance;—that the same can be economically removed from the crude oil only during the process of its distillation, and that desulphurization of the oil can be thus effected by the simultaneous introduction of oxygen and an alkali or base. See United States Letters Patent No. 257,961, granted to me May 16, 1882. The tendency of the bottom, or portion of the still directly exposed to both the fire of the furnace and action of the substance being treated, to become coked by reason of such combined exposure, has been a great evil and hinderance to the uninterrupted distillation and equal and uniform vaporization of the substance undergoing distillation, and great care had to be exercised to guard against and preclude any serious results or accidents.

The object of my present invention is to protect the thus exposed portion of the still and insure an equal and uniform vaporization of the oil or substance being treated, and to introduce simultaneously, in a convenient, simple and comparatively inexpensive manner, the oxygen and base necessary for the economic desulphurization of the oil.

The accompanying drawing shows an elevation, partly in section, of an upright cylindrical still, suitable for use in carrying out my process.

A represents a still of the upright, cylindrical variety, the same comprising two compartments 1 and 2 separated by an inclined diaphragm or partition, 3, the latter having an opening, as at 4, for affording exit to the vapors generated in the distillation of the oil or substance in compartment 1. Directly over opening 4, say about midway of compartment 2, is a hood or drip-roof, 5, supported in any suitable manner, for instance, by rods 6 that depend from the dome of the still, and an annular flange, or ring or cylinder, is provided as at 7, around opening 4; parts 5 and 7 preventing any vapor that may have been condensed in compartment 2 returning and splashing into the contents of compartment 1. The construction of the still, however, and the system and arrangement of pipes for conducting off the vapors to a condenser, &c., are substantially the same as disclosed in United States Letters Patent No. 443,328, granted to me December 23, 1890, and No. 454,061, granted June 16, 1891, and it is, therefore, not considered necessary to incumber this specification with a detailed description of the same.

My improved process consists in covering or protecting the bottom or portion of the still exposed to the fire of the furnace (not shown) with a layer 8 of absorbent and practically non-inflammable and indestructible material, such for instance, as mineral wool. This material is impregnated or then saturated with a solution, (preferably a saturated solution,) of oxygen and a base, such, for instance, as plumbate of soda, and when the still has been charged with the oil or substance to be treated, and material 8 saturated or impregnated as aforesaid, the contents of the still are subjected to a sufficiently high temperature to effect the vaporization of the substance being treated, the plumbate of soda, or oxygen and base, attacking the sulphur contained in the oil or substance so that desulphurization of the latter follows. I prefer the use of plumbate of soda for its remarkable power of attacking sulphur. The thickness of the layer of absorbent material 8, that should be practically non-inflammable and indestructible as aforesaid, largely depends upon the quantity and quality of the substance to be treated. For a charge of five hundred barrels American crude petroleum, such as, or similar to, that produced in the State of Ohio, I use a layer of about twelve inches. In case the solution of the oxygen and base, with which the layer of material 8 was saturated, is found to be, during the process of distillation, insufficient in quantity for the treatment of the entire charge of the still, an additional supply of the oxygen and base solution can be introduced by a device, such, for instance, as shown at 9 in the drawing. 9 represents a pipe that leads into compartment 1 of the still near the upper end thereof and extends down through said compartment to and preferably into the absorbent material 8, thence extending approximately perpendicularly to the side of the still to the central portion of the layer of material 8 where it discharges into said material, being provided with a nozzle or rosette, 10, at its discharge-end, as shown. Just outside the still pipe 9 is provided with a cock or valve 11, the latter connecting with a T 12. The T, in turn, has connected therewith another cock or valve, as at 13, and a trap as at 14, the latter being provided with a funnel, 15. The liquid is poured in at the funnel; any reflex passage of the same is prevented by the trap, and by an inspection at valve or cock 13 can be ascertained when pipe 9 is full, after which cock or valve 11 is closed. It is obvious that the liquid or solution is discharged from pipe 9 in a heated condition, for, as shown, said pipe is located almost entirely in compartment 1 of the still, and hence the liquid becomes heated during its passage through said pipe. It is advisable, however, to have material 8 impregnated with a quantity of the oxygen and base solution sufficient for the entire charge of the still before proceeding with the process of vaporization.

What I claim is—

1. An inside lining or covering for stills consisting of an absorbent and practically non-inflammable and indestructible material, substantially as set forth.

2. An inside lining or covering for stills consisting of mineral wool impregnated or saturated with plumbate of soda, substantially as set forth.

3. The combination with a still having an inside lining of absorbent and practically non-inflammable and indestructible material of means for introducing an agent such as oxygen and base simultaneously through said material, substantially as set forth.

In testimony whereof I sign this specification, in the presence of two witnesses, this 6th day of June, 1891.

THOMSON McGOWAN.

Witnesses:
C. H. DORER,
WARD HOOVER.